United States Patent
Borsuk et al.

(10) Patent No.: US 9,439,273 B2
(45) Date of Patent: Sep. 6, 2016

(54) ULTRAVIOLET LAMP SYSTEM AND METHOD FOR CONTROLLING EMITTED ULTRAVIOLET LIGHT

(75) Inventors: James M. Borsuk, Westlake, OH (US); James Khoury, Strongsville, OH (US); Edward C. McGhee, Amherst, OH (US); James Smith, Amherst, OH (US)

(73) Assignee: Nordson Corporation, Westlake, OH (US)

( * ) Notice: Subject to any disclaimer, the term of this patent is extended or adjusted under 35 U.S.C. 154(b) by 643 days.

(21) Appl. No.: 13/704,385

(22) PCT Filed: Jul. 12, 2011

(86) PCT No.: PCT/US2011/043706
§ 371 (c)(1),
(2), (4) Date: Dec. 14, 2012

(87) PCT Pub. No.: WO2012/009353
PCT Pub. Date: Jan. 19, 2012

(65) Prior Publication Data
US 2013/0093322 A1    Apr. 18, 2013

Related U.S. Application Data

(60) Provisional application No. 61/363,572, filed on Jul. 12, 2010.

(51) Int. Cl.
*H01J 7/24* (2006.01)
*H05B 31/26* (2006.01)
(Continued)

(52) U.S. Cl.
CPC .......... *H05B 41/38* (2013.01); *H05B 41/2806* (2013.01); *Y02B 20/22* (2013.01)

(58) Field of Classification Search
CPC ........... G03F 7/70033; G03F 7/70175; H01L 21/67115; H01L 21/02348; H01J 65/044; H01J 65/04; H05G 2/008
USPC ............ 315/111.21–111.81; 250/365, 504 R, 250/423 R, 493.1, 492.1, 492.2, 492.3, 251, 250/424, 396 ML
See application file for complete search history.

(56) References Cited

U.S. PATENT DOCUMENTS 4,665,627 A    5/1987  Wilde et al.
5,723,943 A *  3/1998  Brooker et al. .............. 313/524
(Continued)

FOREIGN PATENT DOCUMENTS

CN    1343852 A    4/2002
CN    1422436 A    6/2003
(Continued)

OTHER PUBLICATIONS

International Preliminary Examining Authority, International Preliminary Report on Patentability issued in related International application No. PCT/US11/43706 dated Dec. 20, 2012.
(Continued)

*Primary Examiner* — Anh Tran
(74) *Attorney, Agent, or Firm* — Baker & Hostetler LLP

(57) ABSTRACT

Embodiments of the invention provide an apparatus, method, and program product to control a lamp system. The apparatus comprises a plasma lamp bulb (20) and a microwave generator (12) operable to generate a microwave energy field to excite the plasma lamp bulb (20) to emit ultraviolet light (24). The apparatus further comprises a sensor (70) to measure the intensity of the ultraviolet light (24) and a reflector (42) positioned between the plasma lamp bulb (20) and the sensor (70). The reflector (42) is operable to reflect at least a portion of the ultraviolet light (24) generated by the plasma lamp bulb (20). The method comprises receiving a target intensity for the ultraviolet light (24) and measuring an intensity of the ultraviolet light (24) using a sensor (70). The method further comprises comparing the target intensity to the measured intensity and, in response to the comparison, adjusting power to a microwave generator (12) to adjust the intensity of the ultraviolet light (24).

23 Claims, 6 Drawing Sheets

(51) Int. Cl.
*H05B 41/38* (2006.01)
*H05B 41/28* (2006.01)

(56) References Cited

U.S. PATENT DOCUMENTS

| | | |
|---|---|---|
| 6,323,601 B1 | 11/2001 | Klein et al. |
| 6,850,010 B1* | 2/2005 | Barry et al. ............... 315/39.51 |
| 7,544,948 B2 | 6/2009 | Schonlein et al. |
| 7,709,814 B2* | 5/2010 | Waldfried et al. ......... 250/492.2 |
| 2003/0020414 A1 | 1/2003 | Schmitkons et al. |
| 2003/0142198 A1 | 7/2003 | Miyake |
| 2004/0183481 A1 | 9/2004 | Borsuk et al. |
| 2005/0173375 A1 | 8/2005 | Mitrovic et al. |
| 2006/0049360 A1 | 3/2006 | Schoenlein et al. |
| 2008/0067425 A1* | 3/2008 | Kaszuba et al. ........... 250/492.2 |
| 2009/0127480 A1* | 5/2009 | Briggs et al. ............. 250/504 R |
| 2010/0096569 A1* | 4/2010 | Nguyen et al. ............ 250/505.1 |

FOREIGN PATENT DOCUMENTS

| | | |
|---|---|---|
| CN | 1685466 A | 10/2005 |
| CN | 1734252 A | 2/2006 |
| JP | 2002079203 A | 3/2002 |
| JP | 2002175711 A | 6/2002 |
| JP | 2004041843 A | 2/2004 |
| JP | 2008053014 A | 3/2008 |
| JP | 2009289527 A | 12/2009 |
| JP | 2009289528 A | 12/2009 |
| JP | 2010118370 A | 5/2010 |

OTHER PUBLICATIONS

International Searching Authority, International Search Report and Written Opinion issued in related International application No. PCT/US2011/043706 dated Oct. 31, 2011.

The State Intellectual Property Office of the People's Republic of China, Office Action issued in application No. 201180034214.5 dated Mar. 17, 2014.

The State Intellectual Property Office of the People's Republic of China, translation of Office Action issued in application No. 201180034214.5 dated Mar. 20, 2015.

Japanese Patent Office, Office Action in JP Application No. 2013-519767, Mar. 24, 2015.

* cited by examiner

ULTRAVIOLET LAMP SYSTEM AND METHOD FOR CONTROLLING EMITTED ULTRAVIOLET LIGHT

FIELD OF THE INVENTION

The present invention relates generally to ultraviolet lamp systems and, more particularly, to regulation of microwave-excited ultraviolet lamp systems.

BACKGROUND OF THE INVENTION

Ultraviolet (UV) lamp systems are commonly used for heating and curing materials such as adhesives, sealants, inks, and coatings. Certain UV lamp systems have electrodeless light sources and operate by exciting an electrodeless plasma lamp with microwave energy. In an electrodeless UV lamp system that relies upon excitation with microwave energy, the electrodeless plasma lamp is mounted within a metallic microwave cavity or chamber. One or more microwave generators, such as magnetrons, are coupled via waveguides with the interior of the microwave chamber. The magnetrons supply microwave energy to initiate and sustain a plasma from a gas mixture enclosed in the plasma lamp. The plasma emits a characteristic spectrum of electromagnetic radiation strongly weighted with spectral lines or photons having UV and infrared wavelengths.

To irradiate a substrate, the UV light is directed from the microwave chamber through a chamber outlet to an external location. The chamber outlet is capable of blocking emission of microwave energy while allowing UV light to be transmitted outside the microwave chamber. A fine-meshed metal screen often covers the chamber outlet of many conventional UV lamp systems. The openings in the metal screen transmit the UV light for irradiating a substrate positioned outside the RF chamber; yet substantially block the emission of microwave energy. In some conventional UV lamp systems, a shutter also covers the chamber outlet and is selectively operable to expose the substrate to the UV light.

Some applications of the UV lamp systems require very precise intensities of UV light. These applications are sensitive to changes in the UV light intensity, requiring the light intensity to be substantially constant. Providing a substantially constant UV light intensity presents some challenges. Conventional methods of measuring UV light intensity utilize UV intensity sensors that are placed below the light source. These sensors measure the UV light intensity of the light source once and cannot indicate the UV light intensity from successive applications without interrupting the use of that light source. Moreover, such sensors are often prone to solarization due to the constant exposure to high intensity UV light, rendering them inoperable. Still further, such methods are typically performed by the lamp system customer or the lamp system vendor during setup and/or maintenance, which are disruptive to the use of the UV lamp systems. Such methods also require significant time by the customer to configure future UV intensities that can be used for their applications that will "degrade gracefully" as those UV lamp systems decrease in their intensity.

Operators of the UV lamp systems therefore often use preventative maintenance and bulb replacement schedules in an attempt to ensure a high level of process control, as automated performance detection and control systems that take into account UV light intensity are not available. But these maintenance schedules also significantly interrupt the use of the UV lamp system, because any processing of substrates is halted to perform any maintenance or testing. Moreover, these maintenance schedules generally fail to take into account and adjust for degradation and/or contamination of the UV lamp system between various applications and/or substrates. This is often a problem for applications that require a high degree of consistency.

SUMMARY OF THE INVENTION

Embodiments of the present invention address these and other problems associated with the prior art by providing an apparatus to generate ultraviolet light, a method of controlling a lamp system that produces ultraviolet light, and a program product. The apparatus comprises a plasma lamp bulb, a microwave generator operable to generate a microwave energy field to excite the plasma lamp bulb to emit ultraviolet light, and a sensor configured to measure the intensity of the ultraviolet light and a reflector positioned between the plasma lamp bulb and the sensor. The reflector is operable to reflect at least a portion of the ultraviolet light generated by the plasma light bulb.

In alternative embodiments, the method is for controlling a lamp system that produces ultraviolet light. The method comprises receiving a target intensity for the ultraviolet light and measuring an intensity of the ultraviolet light using a sensor. The method further comprises comparing the target intensity to the measured intensity and, in response to the comparison, adjusting power to a microwave generator to adjust the intensity of the ultraviolet light.

In further alternative embodiments, the program product comprises program code configured to, when executed by a processing unit, program code configured to, when executed by a processing unit, receive a target intensity for the ultraviolet light, measure an intensity of the ultraviolet light using a sensor, compare the target intensity to the measured intensity, and adjust power to a microwave generator to adjust the intensity of the ultraviolet light in response to the comparison. The program product further comprises a computer recordable medium bearing the program code.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION

In general, there are variations in the power output of magnetrons used in ultraviolet (UV) lamp systems, contamination that occurs on the UV bulb or reflector of UV lamp systems, and degradation of components of the UV lamp system. Thus, there are often variations in the UV radiation or light produced due to those factors. These variations, in turn, directly correlate to variations in the UV light intensity from the UV lamp system. This creates difficulties for some applications that are sensitive to changes in the intensity of UV light, and in particular critical processes that tend to require consistent UV light intensity.

Figure 1:
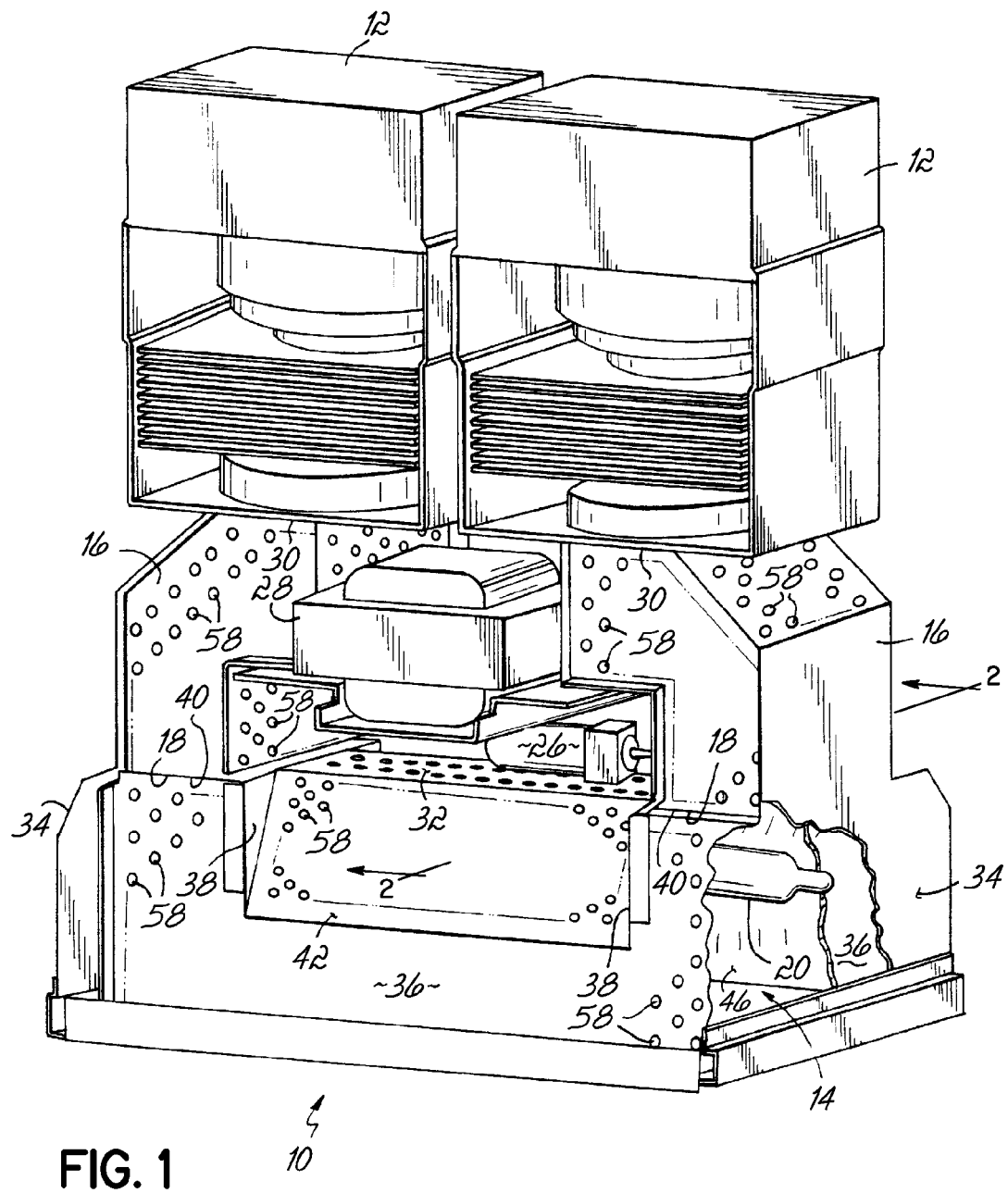
FIG. 1 is a perspective view of a microwave excited ultraviolet (UV) lamp system consistent with an embodiment of the invention.

Turning now to the drawings, wherein like numbers denote like parts throughout the several views, FIG. 1 shows a microwave excited UV lamp system or light source 10 is shown consistent with embodiments of the invention. Light source 10 includes a pair of microwave generators, illustrated as a pair of magnetrons 12, that are each coupled to a longitudinally extending microwave chamber 14 through a respective waveguide 16. Each waveguide 16 has an outlet port 18 coupled to an upper end of the microwave chamber 14 so that microwaves generated by the pair of microwave generators 12 are coupled to the microwave chamber 14 in spaced longitudinal relationship adjacent opposite upper ends of the chamber 14.

An electrodeless plasma lamp, in the form of a sealed, longitudinally extending plasma lamp bulb 20, is mounted within the microwave chamber 14 and supported adjacent the upper end of the chamber 14 as is well known in the art. While not shown, it will be appreciated that light source 10 is mounted within a cabinet or housing well known to those of ordinary skill in the art that includes a source of pressurized air that is operable to direct air into the microwave chamber 14, represented diagrammatically by arrows 22 in FIG. 2, to cool the plasma lamp bulb 20.

Figure 2:
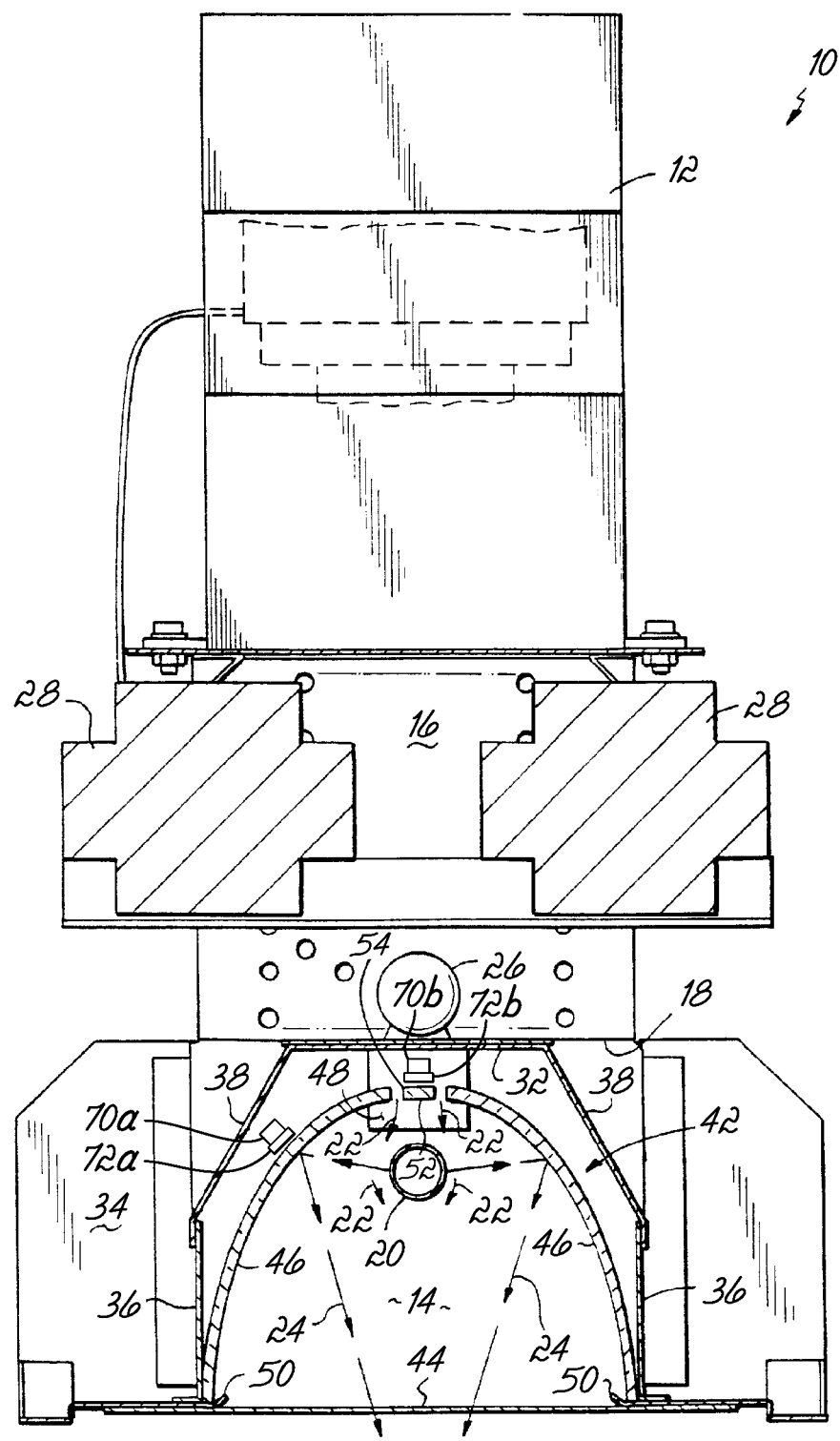
FIG. 2 is a cross-sectional view of the UV lamp system of FIG. 1 taken along line 2-2 of FIG. 1.

Light source 10 is designed and constructed to emit UV light or light, illustrated diagrammatically by arrows 24 in FIG. 2, from a bottom end of the microwave chamber 14 upon sufficient excitation of the plasma lamp bulb 20 by microwave energy coupled to the microwave chamber 14 from the pair of microwave generators 12. While a pair of magnetrons 12 are illustrated and described herein, it is to be understood that the light source 10 may include only a single magnetron 12 to excite the plasma lamp bulb 20 without departing from embodiments of the invention.

Light source 10 includes a starter bulb 26, and a pair of transformers 28 that are each electrically coupled to a respective one of the magnetrons 12 to energize filaments of the magnetrons 12 as understood by those skilled in the art. The magnetrons 12 are mounted to inlet ports 30 of the waveguides 16 so that microwaves generated by the magnetrons 12 are discharged into the chamber 14 through the longitudinally spaced apart outlet ports 18 of the waveguides 16. Preferably, the frequencies of the two magnetrons 12 are split or offset by a small amount to prevent intercoupling between them during operation of the light source 10. In specific embodiments, a first magnetron 12 may produce a signal of about 2.4 GHz, while a second magnetron 12 produces a signal that has a difference up to about 20 MHz from the first magnetron 12.

As best understood with reference to FIGS. 1 and 2, microwave chamber 14 includes a generally horizontal top wall 32, a pair of generally vertical opposite end walls 34, and a pair of generally vertical opposite side walls 36 that extend longitudinally between the end walls 34 and on opposite sides of the plasma lamp bulb 20. Microwave chamber 14 further includes inclined walls 38 that extend upwardly and inwardly from the side walls 36 toward the top wall 32. A pair of openings 40 is provided at an upper end of the microwave chamber 14 that are aligned with and coupled to the outlet ports 18 of the waveguides 16. In this way, microwave energy generated by the pair of magnetrons 12 is coupled to the microwave chamber 14 to excite the plasma lamp bulb 20 with sufficient energy to emit UV light 24. Of course, other configurations of the microwave chamber 14 are possible without departing from embodiments of the invention.

Consistent with embodiments of the invention, a longitudinally extending reflector 42 is mounted within the microwave chamber 14 for reflecting the UV light 24 emitted from the plasma lamp bulb 20 toward a substrate (not shown) from the bottom end of the microwave chamber 14. Reflector 42 preferably has an elliptical configuration in transverse cross-section, although parabolic or other cross-sectional configurations are possible without departing from the spirit and scope of the present invention. A mesh screen 44 is mounted to the bottom end of the microwave chamber 14 that is transparent to the emitted UV light 24 while remaining opaque to the microwaves generated by the pair of magnetrons 12.

In some embodiments, the reflector 42 is made of coated glass. For example, one side 42a of the reflector 42 (e.g., the plasma lamp bulb side) includes a dichroic coating 45 as best shown in FIG. 4C while the other side of the reflector 42 may be sandblasted to provide surface roughening at a scale not visible in FIG. 4C. The dichroic coating 45 may be comprised of layers of a refractory dioxide. Thus, the reflector 42 is substantially transparent to the microwave energy generated by the pair of magnetrons 12 but substantially opaque to, and substantially reflective of, the UV light 24 emitted by the plasma lamp bulb 20. At least some UV light 24, however, is capable of penetrating at least some portion of the reflector 42. For example, dichroic coating 45 may not completely block the UV light 24 or at least one discrete area 45b (FIG. 4E) of the reflector 42 may omit the dichroic coating 45 by not being coated. Alternatively, at least one opening 47 (FIG. 4B) may be configured in the reflector 42.

In any event, the intensity of the UV light 24 transmitted through the reflector 42, transmitted through the opening 47 (FIG. 4B) extending through a thickness of the reflector 42, transmitted through the dichroic coating 45 (FIG. 4C) on the reflector 42, transmitted through a discrete area 45a (FIG. 4D) of the reflector 42 with a thinner portion of dichroic coating 45 than other portions of the reflector 42, or transmitted through a discrete area 45b (FIG. 4E) of the reflector 42 with the dichroic coating 45 removed, may be measured by at least one UV intensity sensor 70 (as illustrated in FIG. 2, UV intensity sensors 70a and 70b).

A shutter 72 may be positioned in front of the sensing portion of each UV intensity sensor 70 and configured to completely block the UV intensity sensor 70 from exposure to the UV light 24 when the shutter 72 is closed, such as when the sensor is not measuring the intensity of the UV light 24 (as illustrated in FIG. 2, shutters 72a and 72b). The closed shutter 72 intervenes to obstruct the field of view for the sensor 70 to the UV light 24 emitted from the plasma lamp bulb 20. Utilizing the shutter 72 to selectively expose the sensing portion of the UV intensity sensor 70 increases the life span and decreases solarization of the UV intensity sensor 70. Moreover, it is also believed that the attenuation of the UV light 24 from the plasma lamp bulb 20 by the reflector 42 also increases the life span and decreases the solarization of the UV intensity sensor 70. Each UV intensity sensor 70 may be a UV intensity sensor as distributed by EIT®, Inc., of Sterling, Va., while each shutter 72 may be a rotary shutter or an iris shutter, both of which are known in the art.

In alternative embodiments, the reflector 42 may be made of another material having suitable reflective, refractive, and/or thermal properties, such as polished aluminum, which is also substantially transparent to the microwave energy generated by a magnetron 12 but substantially opaque to, and substantially reflective of, the UV light 24 emitted by the plasma lamp bulb 20. In those embodiments, the at least one UV intensity sensor 70 may measure the intensity of the UV light 24 emitted by the plasma lamp bulb 20 through at least one respective opening 47 extending through the thickness of the reflector 42.

Although not illustrated, a person having ordinary skill in the art will appreciate that the light source 10 may be coupled with an actuatable shutter assembly (not shown) to ensure that as little UV light 24 escapes from the microwave chamber 14 as possible when that actuatable shutter assembly is closed. Such a shutter assembly is disclosed in U.S. Pat. No. 6,933,683 entitled "Microwave Powered Lamphead Having External Shutter," the disclosure of which is incorporated by reference herein in its entirety.

Consistent with embodiments of the invention, as shown in FIGS. 2, 3, and 4A-4B, the reflector 42 includes a pair of longitudinally extending reflector panels 46 that are mounted in opposing, i.e., mirror facing relationship within the microwave chamber 14 and in spaced relationship to the plasma lamp bulb 20. The pair of reflector panels 46 is mounted within the microwave chamber 14 through a pair of longitudinally spaced apart retainers 48 (FIG. 2), and each reflector panel 46 has its lower end supported on a generally horizontal, inwardly directed flange 50 that extends inwardly from the each chamber side wall 36. In accordance with one aspect of the present invention, a longitudinally extending intermediate member 52 is mounted within the microwave chamber 14 through a pair of slots 54 (FIG. 2) formed in the retainers 48. As shown in FIGS. 2, 3, and 4A-4B, the intermediate member 52 is mounted in spaced relationship to the reflector panels 46, and also in spaced relationship to the plasma lamp bulb 20. The intermediate member 52 may be made of glass, such as PYREX®, and may be uncoated to be non-reflective of the UV light 24 emitted by the plasma lamp bulb 20. Alternatively, the intermediate member 52 may be made of materials similar to those utilized to make the reflector panels 46 (e.g., as discussed above, coated glass, polished aluminum, or some other suitable material).

Further referring to FIGS. 2, 3, and 4A-4B, each of the reflector panels 46 includes a longitudinally extending edge 56 that is generally parallel to a longitudinal axis of the respective reflector panel 46. The intermediate member 52 includes a pair of longitudinally extending opposite edges 58 that are each generally parallel to a longitudinal axis of the intermediate member 52. Each of the reflector panel edges 56 and intermediate member edges 58 preferably has a vertical face 60 and 62, respectively, that is generally parallel to the longitudinal axis of the plasma lamp bulb 20.

When the pair of reflector panels 46 and the intermediate member 52 are mounted in combination within the microwave chamber 14 to form the reflector 42, a pair of spaced, longitudinally extending slots 64 are formed between the edges 56 of the reflector panels 46 and the edges 58 of the intermediate member 52. Consistent with embodiments of the invention, the pair of spaced, longitudinally extending slots 64 are operable to pass air, represented by arrows 22 in FIG. 2, from a pressurized air source (not shown) toward the plasma lamp bulb 20. The slots 64 are preferably aligned generally parallel with and offset from the longitudinal axis of the plasma lamp bulb 20 so that the air 22 envelops the plasma lamp bulb 20 effectively entirely about its outer surface to cool the bulb 20. The pair of slots 64 are oriented so that the air passes along opposite longitudinal sides of the plasma lamp bulb 20 and then merges generally in a region beneath the bulb 20 that is remote form the pair of slots 64.

Figure 3:
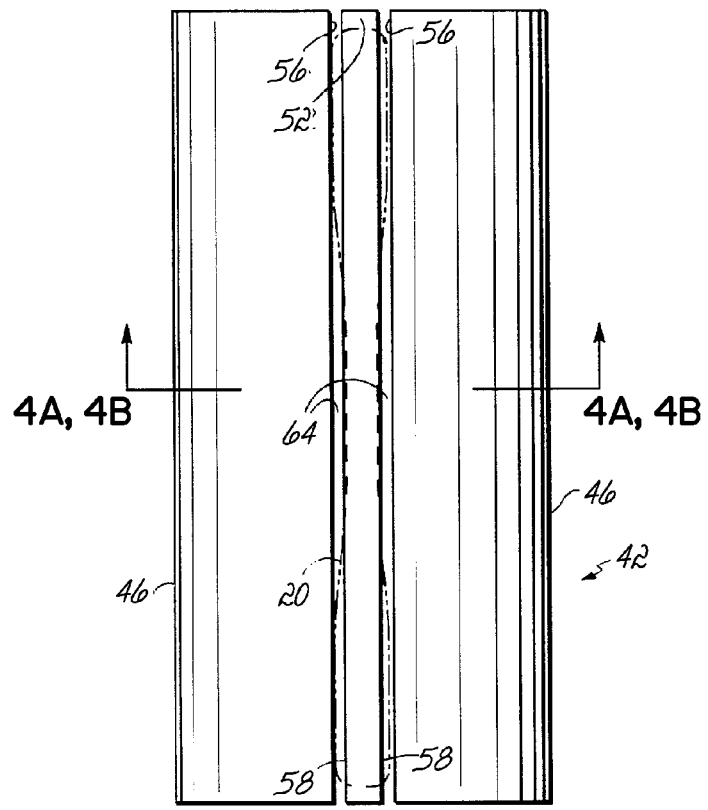
FIG. 3 is a top plan view of a reflector for use in the UV lamp system of FIG. 1.
Figure 4A:
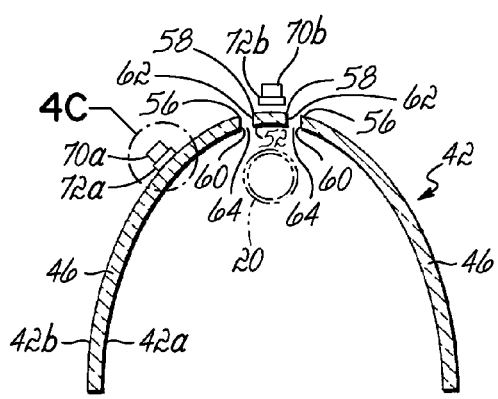
FIG. 4A is a cross-sectional view taken along line 4A-4A of FIG. 3 illustrating first locations for a plurality of UV intensity sensors.
Figure 4B:
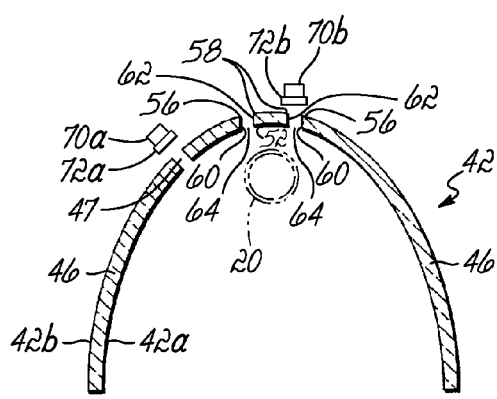
FIG. 4B is a cross-sectional view taken along line 4B-4B of FIG. 3 illustrating second locations for the UV intensity sensors.
Figure 4C:
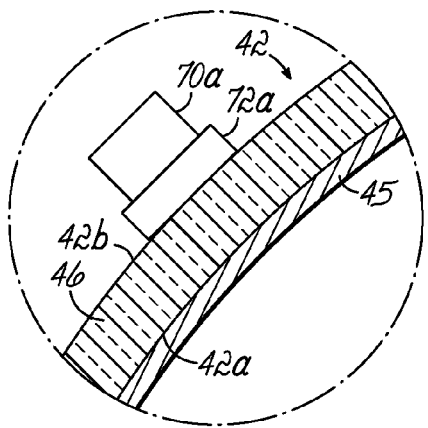
FIG. 4C is an enlarged view of a portion of FIG. 4B in accordance with an alternative embodiment of the invention in which the inner side of the reflector includes a dichroic coating.
Figure 4D:
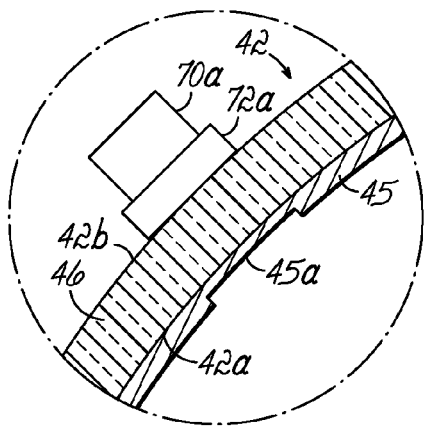
FIG. 4D is an enlarged view similar to FIG. 4C in accordance with an alternative embodiment of the invention in which the reflector includes a dichroic coating with a reduced thickness at a location coinciding with a field of view of one of the UV intensity sensors.
Figure 4E:
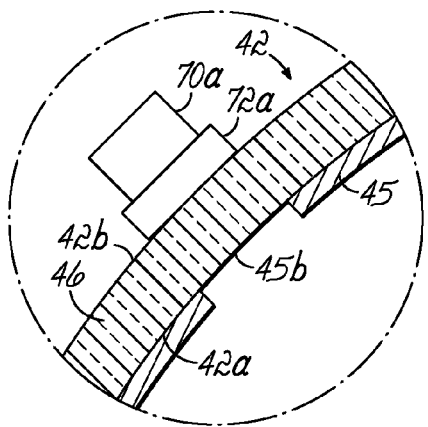
FIG. 4E is an enlarged view similar to FIGS. 4C and 4D in accordance with an alternative embodiment of the invention in which the reflector includes a dichroic coating that is absent at a location coinciding with a field of view of one of the UV intensity sensors.

As shown in FIGS. 2, 3, and 4A-4B, the intermediate member 52, while having a slight curvature transverse to its longitudinal axis, is formed generally as rectangular strip of material and has a generally rectangular transverse cross-sectional configuration as shown in FIGS. 3, 4A, and 4B. In accordance with alternative embodiments of the invention, the intermediate member 52 and/or the reflector panels 46 may have alternative shapes, such as those disclosed in U.S. Pat. No. 6,696,801 entitled "Microwave Excited UV Lamp System with Improved Lamp Cooling," the disclosure of which is incorporated by reference herein in its entirety. In accordance with further alternative embodiments of the invention, the reflector 42 may not include an intermediate member 52 and may instead simply include two reflector panels 46 as would be appreciated by one having ordinary skill in the art.

In some embodiments, and as shown in FIG. 4A, at least one UV intensity sensor 70a and shutter 72a are configured above one of the reflector panels 46 with the sensing portion of the UV intensity sensor 70a oriented generally toward the plasma lamp bulb 20. In particular, the shutter 72a may be in contact with a surface 42b of its respective reflector panel 46. The UV intensity sensor 70a measures the intensity of the UV light that is attenuated through the reflector panel 46.

The measured UV light intensity may be analyzed to determine contamination on, and/or degradation of a portion of the light source 10 (e.g., a magnetron 12, the plasma lamp bulb 20, or the reflector 42). At least one additional UV intensity sensor 70b and shutter 72b are configured above the intermediate member 52 with the sensing portion of the UV intensity sensor 70b, again, oriented generally toward the plasma lamp bulb 20. Again, the shutter 72b may be in contact with a surface of its respective reflector panel 46. In the embodiments in which the intermediate member 52 lacks the dichroic coating 45, the UV intensity sensor 70b directly measures the intensity of the UV light from the plasma lamp bulb 20. Alternatively, and as shown in FIG. 4B, the at least one additional UV intensity sensor 70b and shutter 72b may be configured above a slot 64 and/or above an opening 47 in a reflector panel 46 with the sensing portion of the UV intensity sensor 70b, again, oriented generally toward the plasma lamp bulb 20. In any event, in those embodiments in which the reflector 42 includes one side 42b that is sandblasted, the portions of that reflector 42, reflector panels 46, and/or intermediate member 52 that are below or in contact with a UV intensity sensor 70 and/or shutter 72 may be configured as smooth (e.g., those portions are not sandblasted).

Figure 5:
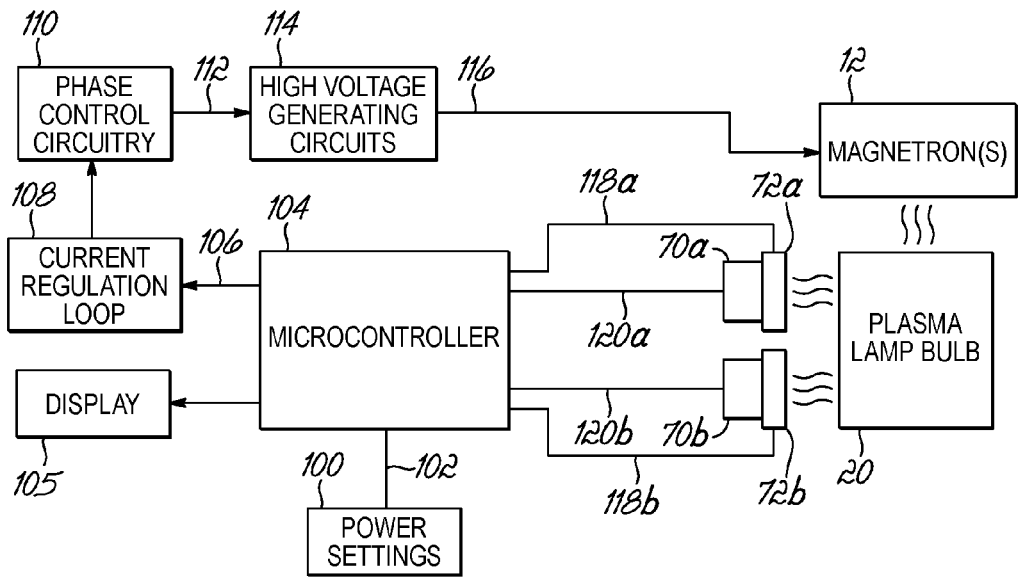
FIG. 5 is a block diagram illustrating a power control circuit for the UV lamp system of FIG. 1.

FIG. 5 shows a block diagram of the light source 10 with an exemplary power control loop consistent with embodiments of the invention. The power control loop circuitry is designed to control the input power to at least one magnetron 12, which generally has a good correlation to the magnetron output power and the intensity of UV light 24 output from the plasma lamp bulb 20. An operator of the light source 10 selects a power setting 100 (which corresponds to a predetermined intensity for the UV light generated by the plasma lamp bulb 20) is sent over a transmission path 102 to a microcontroller 104. The microcontroller 104 may utilize a look-up table to determine the power level for the at least one magnetron 12 and sets a current level in order to achieve the requested output power. The microcontroller 104 then sends a set point current 106 to circuitry for a current regulation loop 108. The current regulation loop 108 includes circuitry operable to provide a current feedback control loop to regulate and provide a substantially constant current output as known in the art.

The current regulation loop 108 utilizes a microcontroller or other processing unit, which may include microcontroller 104 or a separate microcontroller specifically for current regulation. The current regulation loop 108 sends the regulated current to phase control circuitry 110, which sends a variable AC signal 112 to at least one high voltage generating circuit 114. The at least one high voltage generating circuit 114 sends at least one variable high voltage DC signal over a transmission path 116 to the at least one magnetron 12 to produce the desired output, which excites the plasma lamp bulb 20 and in turn generates UV light.

The microcontroller 104 is configured to open or close the shutters 72a and 72b via respective signal lines 118a and 118b. In turn, the UV intensity sensors 70a and 70b measure the intensity of the UV light transmitted through the reflector 42 while the respective shutters 72a and 72b are open and provide respective signals corresponding to those measurements to the microcontroller 104 as at 120a and 120b. In this manner the microcontroller 104 controls the exposure of the sensing portion of a UV intensity sensor 70 to UV light from the plasma lamp bulb 20. As discussed above, it is believed that utilizing a shutter 72 to selectively expose the sensing portion of a UV intensity sensor 70 increases the life span, and decreases solarization of, that UV intensity sensor 70. Specifically, each shutter 72 may be opened when the microcontroller 104 is operating to capture the UV light intensity measured by a respective UV intensity sensor 70, but closed otherwise. Each UV intensity sensor 70 is thus not constantly exposed to constant UV light, preventing wear and decreasing solarization thereof.

Figure 6:
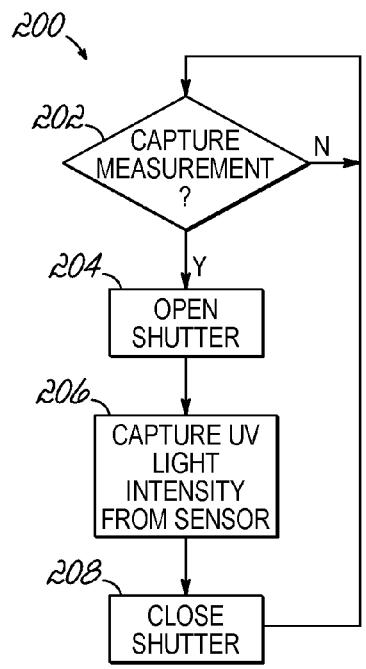
FIG. 6 is a flowchart illustrating a sequence of operations for the power control circuit of FIG. 5 to capture the intensity of UV light from a plasma lamp bulb of the light source of FIG. 1.

FIG. 6 shows a flowchart 200 illustrating a sequence of operations for the microcontroller 104 to capture the UV light intensity measured by a UV intensity sensor 70 consistent with embodiments of the invention. In particular, the microcontroller 104 determines whether to capture a measurement of the intensity of the UV light from the plasma lamp bulb 20 (block 202). In any event, when the microcontroller 104 determines not to capture a measurement of the UV light intensity ("No branch of decision block 202) the sequence of operations returns back to block 202. However, when the microcontroller 104 determines to capture a measurement of the UV light intensity ("Yes" branch of decision block 202) the microcontroller opens the shutter 72 if installed (block 204), captures the UV light intensity from the UV intensity sensor 70 (block 206), and then closes the shutter 72 if installed (block 208). In response to closing the shutter 72, the sequence of operations may return to block 202.

In specific embodiments, the microcontroller 104 is configured to open the shutter 72 and capture a measured intensity of UV light for about one minute. After the measured UV light intensity is captured, the shutter 72 is then closed for about one minute. Thus, the duty cycle for the UV intensity sensor 70 is about one minute out of about every two minutes. Alternatively, the determination to capture a measurement is made once after the light source 10 has been started and had sufficient time to warm up. Thus, the microcontroller 104 may determine whether the intensity of UV light from the plasma lamp bulb 20 is sufficient every time the light source is activated. In alternative embodiments, the determination to capture a measurement is made after a predetermined interval of time, such as about every thirty seconds, about every minute, about every thirty minutes, about every hour, or an alternative interval of time, which the shutter remaining open long enough for the UV intensity sensor 70 to measure the UV light intensity.

During operation, the microcontroller 104 determines whether the measured UV light intensity corresponds to an expected UV light intensity (e.g., an expected UV light intensity that is based upon the user selected power setting 100) and adjusts the power to at least one magnetron 12, if necessary. In particular, it determines the measured UV light intensity with respect to the signals captured from one or more of the UV intensity sensors 70a and 70b.

Figure 7:
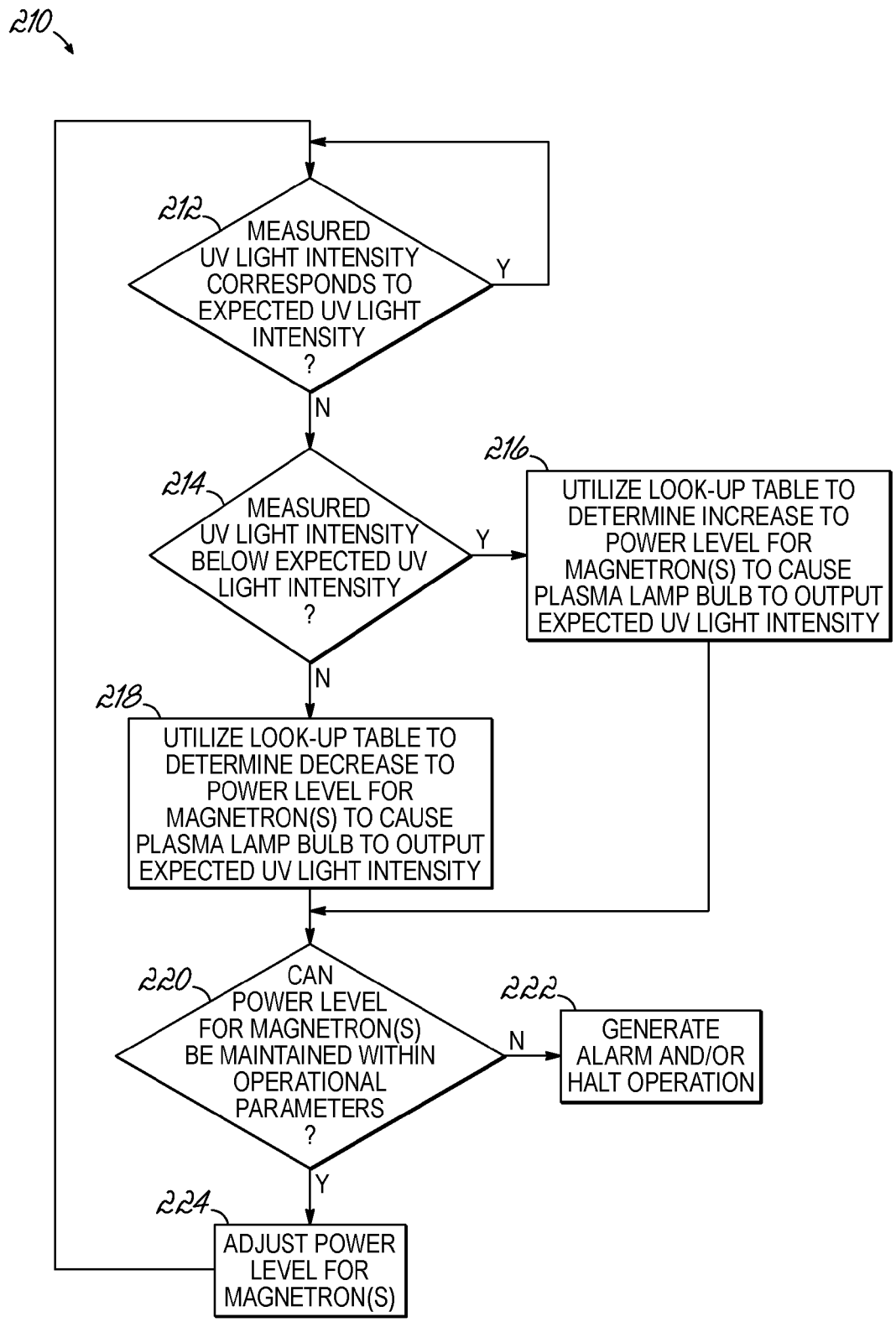
FIG. 7 is a flowchart illustrating a sequence of operations for the power control circuit of FIG. 5 to adjust the power to a magnetron of the light source of FIG. 1.

FIG. 7 shows a flowchart 210 illustrating a sequence of operations for the microcontroller 104 to adjust the power to at least one magnetron 12 consistent with embodiments of the invention. The microcontroller 104 initially determines whether the measured UV light intensity (e.g., the UV light intensity captured from one or more UV intensity sensors 70a and 70b, or a combination thereof) corresponds to the expected UV light intensity from the user selected power setting 100 (block 212). More specifically, the microcontroller 104 may determine in block 212 whether the measured UV light intensity matches the expected UV light intensity associated with the user selected power setting 100 or whether the measured UV light intensity is within a specified range of expected UV light intensity associated with the user selected power setting 100 from a look-up table. When the measured UV light intensity corresponds to an expected UV light intensity ("Yes" branch of decision block 212) the sequence of operations returns to block 212.

When the measured UV light intensity does not correspond to an expected UV light intensity ("No" branch of decision block 212) the microcontroller determines whether the measured UV light intensity is below the expected UV light intensity (block 214). For example, and not intending to be limiting, when the measured UV light intensity is below the expected UV light intensity, this may indicate that the at least one magnetron 12 has experienced degradation, that the plasma lamp bulb 20 has experienced degradation, that the plasma lamp bulb 20 and/or reflector 42 has been contaminated, and/or that at least one other component of the light source 10 has degraded or become contaminated. Correspondingly, when the measured UV light intensity is above the expected UV light intensity, this may indicate that the at least one magnetron 12 has been adjusted or replaced, that the plasma lamp bulb 20 has been replaced, that the plasma lamp bulb 20 and/or reflector 42 have been cleaned, and/or that at least one other component of the light source 10 has been adjusted or replaced. Thus, when the measured UV light intensity is below the expected UV light intensity ("Yes" branch of decision block 214) the microcontroller 104 may utilize a look-up table to determine an increase to the power level for the at least one magnetron 12 to cause the plasma lamp bulb 20 to output the expected UV light intensity (block 216). Correspondingly, when the when the measured UV light intensity is above the expected UV light intensity ("No" branch of decision block 214), the microcontroller 104 may utilize a look-up table to determine a decrease to the power level for the at least one magnetron 12 to cause the plasma lamp bulb 20 to output the expected UV light intensity (block 218).

After determining an increase or decrease to the power level for at least one magnetron 12 (blocks 216 or 218), the microcontroller may determine whether the determined power level for the at least one magnetron can be maintained within operational parameters of the light source 10 (block 220). Specifically, the determined power level may be higher than the power levels capable of being generated with the high voltage generating circuits 114. Thus, when a power level cannot be maintained within operational parameters of the light source 10 ("No" branch of decision block 220), an alarm is generated and/or the operation of the light source is halted (block 222). However, when a power level can be maintained within operational parameters of the light source 10 ("Yes" branch of decision block 220), the power to the at least one magnetron 12 is adjusted to the determined power level (block 224) and the sequence of operations returns to block 212.

In some embodiments, a baseline for the intensity of the UV light generated by the light source 10 is determined during a calibration. In the calibration, the microcontroller 104 may determine the UV light intensity measured by each UV intensity sensor 70 when various levels of power are provided to the at least one magnetron 12. The microcontroller 104 may then utilize that as a basis for the determination of the UV light intensities output by the plasma lamp bulb 20 at the various power levels. As portions of the light source 10 degrade and/or are contaminated, the microcontroller 104 is configured to adapt the actual power levels to the at least one magnetrons 12 to maintain the user selected UV light intensity levels based upon that baseline. The microcontroller 104 may also store historical information regarding the UV light intensity and output that information via an input/output connection, such as a network, USB, or other digital data connection. The microcontroller 104 may also be configured to communicate with, and output historical information to, a printer.

In some embodiments, the microcontroller 104 is also configured to indicate the user selected intensity of the UV light and/or the measured intensity of the UV light from the plasma lamp bulb 20 on a display 105. The display 105 may include a segmented LED display, LCD display, or other display as is known in the art. The microcontroller 104 may display the user-selected intensity or measured intensity as a percentage (e.g., "90%") or in a bar graph form (e.g., a bar graph showing that 90% of available space for the bar graph is covered).

In addition to displaying the user selected intensity or measured intensity of the UV light, the microcontroller 104 may be configured to determine and display an indication of the contamination on the plasma lamp bulb 20 and/or reflector 42. As previously discussed, one UV intensity sensor 70a may be configured to measure the UV light that is transmitted through the reflector 42 while another UV intensity sensor 70b may be configured to measure the UV light directly from the plasma lamp bulb 20 (e.g., through an intermediate member 52 or reflector 42 that lacks a dichroic coating, through a slot 64, or through an opening 47 in the reflector 42). By comparing these two measurements, the microcontroller 104 may be able to determine a difference caused by contamination of the plasma lamp bulb 20 and/or the reflector 42 then indicate that difference on the display.

Thus, embodiments of the invention provide instantaneous intensity feedback of microwave powered UV bulbs within a light source to allow for closed loop control to compensate for degradation of a portion of the light source (e.g., the UV bulb, the reflector, and/or a magnetron providing microwave power to the UV bulb, among others) as well as contamination of the UV bulb or reflector. This provides consistent UV output over a period of time without sacrificing component life. Moreover, the on/off duty cycle of the opening and closing of a shutter positioned between the UV bulb and a UV intensity sensor provides increased optical protection as well as limits exposure of the UV intensity sensor for longer component life. Embodiments of the invention also provide an "at a glance" indication of the actual output of the UV bulb for preventative maintenance and statistical process control. This, in turn, can minimize or even eliminate down time to visually inspect the UV bulb or reflector, thus yielding more uptime of the system.

The microcontroller 104 may comprise any electrical control apparatus configured to control one or more variables based upon one or more user inputs. Those user inputs can be provided by the user through a user interface that can be a keyboard, mouse and display, or touch screen, for example. The microcontroller 104 can be implemented using at least one processing unit selected from microprocessors, micro-controllers, microcomputers, digital signal processors, central processing units, field programmable gate arrays, programmable logic devices, state machines, logic circuits, analog circuits, digital circuits, and/or any other devices that manipulate signals (analog and/or digital) based on operational instructions that are stored in a memory. The memory may be a single memory device or a plurality of memory devices including but not limited to random access memory (RAM), volatile memory, non-volatile memory, static random access memory (SRAM), dynamic random access memory (DRAM), flash memory, cache memory, and/or any other device capable of storing digital information. The microcontroller 104 may have a mass storage device that may include one or more hard disk drives, floppy or other removable disk drives, direct access storage devices (DASD), optical drives (e.g., a CD drive, a DVD drive, etc.), and/or tape drives, among others.

The processing unit of the microcontroller 104 operates under the control of an operating system, and executes or otherwise relies upon computer program code embodied in various computer software applications, components, programs, objects, modules, data structures, etc. The computer program code residing in memory and stored in the mass storage device also includes control program code that, when executing on the processing unit of the microcontroller 104, performs the process flows shown in FIGS. 6 and 7. The computer program code typically comprises one or more instructions that are resident at various times in memory, and that, when read and executed by the processing unit, causes the microcontroller 104 to perform the steps necessary to execute steps or elements embodying the various embodiments and aspects of the invention.

Various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

A person having ordinary skill in the art will recognize that the environments illustrated in FIGS. 1-5 are not intended to limit the scope of embodiments of the invention. In particular, the light source may include fewer or additional components consistent with alternative embodiments of the invention. Indeed, a person having skill in the art will recognize that other alternative hardware and/or software environments may be used without departing from the scope of the invention. For example, the light source may include more or fewer UV intensity sensors and/or shutters, as well as differently shaped reflectors.

Additionally, the routines executed to implement the embodiments of the invention, whether implemented as part of an operating system or a specific application, component, program, object, module or sequence of instructions executed by one or more control systems or microcontrollers have been referred to herein as a "sequence of operations," a "program product," or, more simply, "program code." The program code typically comprises one or more instructions that are resident at various times in various memory and storage devices in a light source and that, when read and executed by one or more control systems or microcontrollers, cause that light source 10 to perform the steps necessary to execute steps, elements, and/or blocks embodying the various aspects of the invention.

While embodiments of the invention have been described in the context of fully functioning light sources, those skilled in the art will appreciate that the various embodiments of the invention are capable of being distributed as a program product in a variety of forms, and that the invention applies equally regardless of the particular type of computer recordable signal bearing media used to actually carry out the distribution. Examples of computer recordable signal bearing media include but are not limited to physical and tangible recordable type media such as volatile and non-volatile memory devices, floppy and other removable disks, hard disk drives, flash memory drives, and optical disks (e.g., CD-ROM's, DVD's, Blu-Ray Discs, etc.), among others.

In addition, various program code may be identified based upon the application or software component within which it is implemented in a specific embodiment of the invention. However, it should be appreciated that any particular program nomenclature is used merely for convenience, and thus embodiments of the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program Furthermore, while embodiments of the invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, apparatuses, and/or methods shown and described. In particular, a person having ordinary skill in the art will appreciate that any of the blocks of the above flowcharts may be deleted, augmented, made to be simultaneous with another, combined, or be otherwise altered in accordance with the principles of the embodiments of the invention. Accordingly, departures may be made from such details without departing from the spirit or scope of applicants' general inventive concept.

What is claimed is:

1. An apparatus for generating ultraviolet light, the apparatus comprising:
   a chamber;
   a plasma lamp bulb inside said chamber;
   a microwave generator operable to generate a microwave energy field to excite said plasma lamp bulb to emit the ultraviolet light;
   a sensor inside said chamber and configured to measure an intensity of the ultraviolet light; and
   a reflector inside said chamber and positioned between said plasma lamp bulb and said sensor, said reflector operable to reflect the ultraviolet light generated by said plasma light bulb and to transmit a portion of the ultraviolet light through said reflector to said sensor.

2. The apparatus of claim 1, further comprising:
   a control system configured to control emission of the ultraviolet light, said control system configured to receive a target intensity for the ultraviolet light, determine the measured intensity of the ultraviolet light from said sensor, evaluate whether the target intensity corresponds to the measured intensity, and adjust power to said microwave generator to adjust the intensity of the ultraviolet light.

3. The apparatus of claim 2, wherein said control system is further configured to increase the power to said microwave generator when the target intensity of the ultraviolet light is higher than the measured intensity of the ultraviolet light.

4. The apparatus of claim 2, wherein said control system is further configured to decrease the power to said microwave generator when the target intensity of the ultraviolet light is lower than the measured intensity of the ultraviolet light.

5. The apparatus of claim 2, further comprising:
a shutter positioned between said sensor and said reflector, said shutter configured to substantially block ultraviolet light from at least a portion of said sensor.

6. The apparatus of claim 5, wherein said control system is further configured to operate said shutter to at least partially expose said portion of said sensor to the ultraviolet light.

7. The apparatus of claim 2, wherein said control system includes a display, and said control system is further configured to indicate the measured intensity of the ultraviolet light on said display.

8. The apparatus of claim 2, wherein said control system includes a display, and said control system is further configured to determine a variation in at least one of said plasma lamp bulb, said reflector, or said microwave generator and indicate the variation on said display.

9. The apparatus of claim 1, wherein said sensor measures the intensity of the ultraviolet light through a thickness of said reflector.

10. The apparatus of claim 9, wherein said reflector includes a dichroic coating, and said sensor measures the intensity of the ultraviolet light transmitted through said dichroic coating.

11. The apparatus of claim 9, wherein said reflector includes a dichroic coating with a first portion of a first thickness and a second portion of a second thickness, and said sensor measures the intensity of the ultraviolet light transmitted through said second portion of said dichroic coating.

12. The apparatus of claim 9, wherein said reflector includes dichroic coating and a portion of said reflector lacks said dichroic coating, and said sensor measures the intensity of the ultraviolet light transmitted through said portion of said reflector.

13. The apparatus of claim 1, wherein said reflector includes an opening extending through a thickness of said reflector, and said sensor is configured to measure the intensity of the ultraviolet light transmitted through said opening.

14. The apparatus of claim 1, further comprising:
a shutter positioned between said sensor and said reflector, said shutter configured to substantially block the ultraviolet light from at least a portion of said sensor when closed.

15. A method of controlling a lamp system that produces ultraviolet light, comprising:
generating the ultraviolet light with a plasma lamp bulb located inside a chamber;
reflecting the ultraviolet light with a reflector inside the chamber;
receiving a target intensity for the ultraviolet light;
transmitting a portion of the ultraviolet light through the reflector to a sensor inside the chamber;
measuring an intensity of the ultraviolet light using the sensor;
comparing the target intensity with the measured intensity; and
adjusting power to a microwave generator in response to the comparison to adjust the intensity of the ultraviolet light.

16. The method of claim 15, wherein adjusting the power comprises:
if the target intensity of the ultraviolet light is higher than the measured intensity of the ultraviolet light, increasing the power to the microwave generator.

17. The method of claim 15, wherein adjusting the power comprises:
if the target intensity of the ultraviolet light is lower than the measured intensity of the ultraviolet light, decreasing the power to the microwave generator.

18. The method of claim 15, wherein measuring the intensity of the ultraviolet light using the sensor comprises:
operating a shutter associated with the sensor to at least partially expose a portion of the sensor; and
capturing an indication of the measured intensity of the ultraviolet light from the sensor.

19. The method of claim 15, wherein measuring the intensity of the ultraviolet light using the sensor comprises:
operating the shutter to block the portion of the sensor from exposure to the ultraviolet light.

20. The method of claim 15, further comprising:
indicating the measured intensity of the ultraviolet light on a display.

21. The method of claim 15, further comprising:
determining a variation in at least one of the plasma lamp bulb, the reflector, or a magnetron configured to provide microwave energy used to excite the plasma lamp bulb to generate the ultraviolet light; and
indicating the variation on a display.

22. The method of claim 15, wherein measuring the intensity of the ultraviolet light using the sensor further comprises:
transmitting the ultraviolet light through a dichroic coating on the portion of the reflector.

23. The method of claim 15, wherein measuring the intensity of the ultraviolet light using the sensor further comprises:
transmitting the ultraviolet light through an opening in the reflector to the sensor.

* * * * *